(12) United States Patent
Takahashi

(10) Patent No.: US 10,569,753 B2
(45) Date of Patent: Feb. 25, 2020

(54) HYDRAULIC BRAKE DEVICE

(71) Applicant: TOYOTA JIDOSHA KABUSHIKI KAISHA, Toyota-shi, Aichi-ken (JP)

(72) Inventor: Yu Takahashi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 125 days.

(21) Appl. No.: 15/963,249

(22) Filed: Apr. 26, 2018

(65) Prior Publication Data

US 2018/0339688 A1 Nov. 29, 2018

(30) Foreign Application Priority Data

May 26, 2017 (JP) ................................. 2017-104935

(51) Int. Cl.
| | |
|---|---|
| *B60T 13/58* | (2006.01) |
| *B60T 11/16* | (2006.01) |
| *B60T 8/40* | (2006.01) |
| *B60T 1/06* | (2006.01) |
| *B60T 8/32* | (2006.01) |
| *B60T 13/68* | (2006.01) |
| *B60T 13/66* | (2006.01) |
| *B60T 17/22* | (2006.01) |

(Continued)

(52) U.S. Cl.
CPC ............. *B60T 13/58* (2013.01); *B60T 1/065* (2013.01); *B60T 7/042* (2013.01); *B60T 8/326* (2013.01); *B60T 8/4081* (2013.01); *B60T 8/4086* (2013.01); *B60T 11/165* (2013.01); *B60T 11/20* (2013.01); *B60T 13/146* (2013.01); *B60T 13/662* (2013.01); *B60T 13/686* (2013.01); *B60T 17/221* (2013.01); *B60T 2270/404* (2013.01); *B60T 2270/82* (2013.01)

(58) Field of Classification Search
CPC ...... B60T 8/4086; B60T 8/326; B60T 11/165; B60T 13/58; B60T 2270/404; B60T 2270/82

See application file for complete search history.

(56) References Cited

U.S. PATENT DOCUMENTS

| | | | |
|---|---|---|---|
| 2006/0066146 A1 | 3/2006 | Otomo | |
| 2015/0314767 A1* | 11/2015 | Miyazaki | B60T 8/4081 303/10 |

(Continued)

FOREIGN PATENT DOCUMENTS

JP 2006-123889 A 5/2006

*Primary Examiner* — Vishal R Sahni
(74) *Attorney, Agent, or Firm* — Sughrue Mion, PLLC

(57) ABSTRACT

A hydraulic brake device includes (a) a master fluid passage for supplying a working fluid from a master cylinder to a wheel brake, (b) a master shut-off valve provided in the master fluid passage, (c) a return fluid passage, (d) a return passage opening valve provided in the return fluid passage, (e) an electromagnetic control valve provided in the return fluid passage and configured to control a flow of the working fluid or to allow a flow of the working fluid without controlling, and (f) a stroke simulator having first and second fluid chambers defined by a partition member, the first fluid chamber being connected to the master fluid passage between the master shut-off valve and the master cylinder, the second fluid chamber being connected to the return fluid passage on one on opposite sides of the return passage opening valve that is nearer to the wheel brake.

6 Claims, 8 Drawing Sheets

(51) Int. Cl.
  *B60T 11/20* (2006.01)
  *B60T 7/04* (2006.01)
  *B60T 13/14* (2006.01)

(56) References Cited

U.S. PATENT DOCUMENTS

2017/0015290 A1* 1/2017 Oosawa ................ B60T 8/4081
2018/0312151 A1* 11/2018 Yamaguchi ............... B60T 8/34
2019/0039579 A1* 2/2019 Ohkubo .................... B60T 8/17
2019/0217834 A1* 7/2019 Maruo .................. B60T 8/4081

\* cited by examiner

HYDRAULIC BRAKE DEVICE

CROSS REFERENCE TO RELATED APPLICATION

The present application claims priority from Japanese Patent Application No. 2017-104935, which was filed on May 26, 2017, the disclosure of which is herein incorporated by reference in its entirety.

BACKGROUND

Technical Field

The following disclosure relates to a hydraulic brake device configured to generate a braking force for a wheel in dependence on a pressure of a working fluid.

Description of Related Art

A hydraulic brake device such as a master-cut type hydraulic brake device disclosed in Patent Literature 1 (Japanese Patent Application Publication No. 2006-123889) has been conventionally known. The known hydraulic brake device is configured such that, in a normal condition (in which the hydraulic brake device is not suffering from any failure), a supply of a working fluid from a master cylinder to a wheel brake is shut off and a braking force is generated by a pressure of the working fluid which is supplied to the wheel brake from a high-pressure source provided independently of the master cylinder and whose pressures is adjusted.

The thus configured hydraulic brake device is equipped with a stroke simulator (hereinafter simply referred to as "simulator" where appropriate) for ensuring an operation feeling of a brake operation member connected to the master cylinder. When some failure occurs in the hydraulic brake device, namely, when the hydraulic brake device is in a failure condition, it is needed to generate the braking force by a pressure of the working fluid supplied from the master cylinder. In this case, there may be a risk that generation of an appropriate braking force is hindered if the stroke simulator works in such a failure condition. Specifically, an ordinary stroke simulator includes a fluid chamber communicating with a fluid passage of the working fluid that flows from the master cylinder and a pressurizing mechanism for pressurizing the working fluid in the fluid chamber to a pressure in accordance with an increase in the volume of the fluid chamber. When the stroke simulator operates in the failure state, there may be caused inconvenience such as a delay in generation of the braking force and a necessity to operate the brake operation member by a large amount, due to an inflow of the working fluid into the fluid chamber of the stroke simulator.

In terms of such inconvenience, the conventional hydraulic brake device includes a valve, i.e., the so-called simulator opening valve, configured to cut off a flow of the working fluid between the stroke simulator and the master cylinder in the failure condition and to allow the flow of the working fluid therebetween in the normal condition.

SUMMARY

In view of downsizing and simplification of the hydraulic brake device, however, it is preferable not to employ the simulator opening valve. In general, an electromagnetic open/close valve is used as the simulator opening valve. In an instance where such an open/close valve is used, a drive circuit for driving the open/close valve, a harness for electrically connecting the drive circuit and the open/close valve, etc., are required. Thus, an advantage of not employing the simulator opening valve is high because the drive circuit, the harness, etc., are not required. Accordingly, the present disclosure relates to a hydraulic brake device which is downsized and simplified in structure.

In one aspect of the present disclosure, a hydraulic brake device includes (a) a master fluid passage for supplying a working fluid from a master cylinder to a wheel brake, (b) a master shut-off valve provided in the master fluid passage, (c) a return fluid passage for returning the working fluid supplied to the wheel brake to the reservoir not via the master cylinder, (d) a return passage opening valve provided in the return fluid passage, (e) a controlled pressure supply device configured to permit an electromagnetic control valve provided in the return fluid passage to adjust a pressure of the working fluid from a high-pressure source so as to reduce the pressure and configured to supply the pressure-adjusted working fluid to the wheel brake, and (f) a stroke simulator in which a first fluid chamber and a second fluid chamber are defined by a partition member, the first fluid chamber communicating with the master fluid passage on one of opposite sides of the master shut-off valve which is nearer to the master cylinder, the second fluid chamber communicating with the return fluid passage on one of opposite sides of the return passage opening valve which is nearer to the wheel brake.

According to the hydraulic brake device constructed as described above, the braking force that depends on the pressure of the working fluid from the controlled pressure supply device is generated in the normal condition with the master shut-off valve placed in a valve closed state and the return passage opening valve placed in a valve open state while the braking force that depends on the pressure of the working fluid from the master cylinder is generated in the failure condition with the master shut-off valve placed in a valve open state and the return passage opening valve placed in a valve closed state. In such operations of the hydraulic brake device, the second fluid chamber of the simulator is held in communication with the reservoir in the normal condition so that the simulator works in the normal condition, and the pressure of the working fluid in the second fluid chamber is equal to the pressure of the working fluid from the master cylinder in the failure condition so that the simulator does not work in the failure condition. That is, the hydraulic brake device according to the present disclosure obviates the need for employing the open/close valve described above, resulting in a reduced size of the device and a simplified structure of the device.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

(1) A hydraulic brake device configured to generate a braking force for a wheel in dependence on a pressure of a working fluid, comprising:

a brake operation member to be operated by a driver;

a wheel brake provided for the wheel and configured to generate the braking force in accordance with the pressure of the working fluid supplied thereto;

a reservoir storing the working fluid and functioning as a low-pressure source;

a master cylinder configured to pressurize the working fluid stored in the reservoir in dependence on a force applied to the brake operation member by the driver;

a master fluid passage connecting the master cylinder and the wheel brake for supplying, to the wheel brake, the working fluid pressurized by the master cylinder;

a master shut-off valve provided in the master fluid passage and configured to allow a flow of the working fluid from the master cylinder to the wheel brake when it is in a valve open state and configured to prohibit the flow of the working fluid from the master cylinder to the wheel brake when it is in a valve closed state;

a reservoir fluid passage connected to the reservoir not via the master cylinder;

a pump device configured to function as a high-pressure source by being activated when the master shut-off valve is in the valve closed state and configured to pump up the working fluid stored in the reservoir via the reservoir fluid passage and configured to pressurize the working fluid, so as to supply the pressurized working fluid to the wheel brake, a return fluid passage connecting the reservoir or the reservoir fluid passage to the wheel brake;

a return passage opening valve provided in the return fluid passage and configured to be in a closed state when the master shut-off valve is in the open state so as to prohibit a flow of the working fluid to the reservoir through the return fluid passage and configured to be in a valve open state when the master shut-off valve is in the valve closed state so as to allow the flow of the working fluid to the reservoir through the return fluid passage;

an electromagnetic control valve provided in the return fluid passage so as to be disposed in series with the return passage opening valve, the electromagnetic control valve being configured such that, when the master shut-off valve is in the valve closed state, the electromagnetic control valve controls a flow of the working fluid from the wheel brake to the reservoir in accordance with an electric current supplied thereto so as to control the braking force to be generated by the wheel brake and such that, when the master shut-off valve is in the valve open state, no electric current is supplied to the electromagnetic control valve and the electromagnetic control valve allows a flow of the working fluid passing therethrough without controlling the flow; and a stroke simulator including a partition member, a first fluid chamber and a second fluid chamber which are defined by the partition member and which respectively store the working fluid, and a pressurizing mechanism configured to pressurize the working fluid in the first fluid chamber in accordance with an increase in a volume of the first fluid chamber caused by a movement or a deformation of the partition member, the first fluid chamber being connected to the master fluid passage between the master shut-off valve and the master cylinder, the second fluid chamber being connected to the return fluid passage on one on opposite sides of the return passage opening valve that is nearer to the wheel brake.

The hydraulic brake device of this form is the so-called master-cut type hydraulic brake device configured to operate in one of two modes, i.e., a first mode and a second mode. The first mode is established in the normal condition, for instance. In the first mode, the master shut-off valve is placed in the valve closed state while the return passage opening valve is placed in the valve open state, and the working fluid is supplied to the wheel brake by a controlled pressure supply device including the pump device and the electromagnetic control valve while the pressure of the working fluid is adjusted. The braking force is generated in the wheel brake in dependence on the pressure of the supplied working fluid. The second mode is established when the hydraulic brake device is suffering from some failure such as an electric failure, for instance. In the second mode, the master shut-off valve is placed in the valve open state while the return passage opening valve is placed in the valve closed state, and the braking force is generated in dependence on the pressure of the working fluid supplied from the master cylinder, namely, in dependence on an operation force applied by the driver to the brake operation member.

According to the hydraulic brake device of this form, in the first mode, the pressure of the working fluid in the first fluid chamber of the simulator is equal to the pressure of the working fluid supplied from the master cylinder while the pressure of the working fluid in the second fluid chamber of the simulator is equal to the pressure of the working fluid in the reservoir which is substantially equal to the atmospheric pressure. Thus, like ordinary simulators, the simulator of this form works so as to give, to the brake operation member, a reaction force in accordance with an operation amount of the brake operation member by the driver. In other words, the brake operation member is allowed to be operated in an appropriate operation amount in a state in which the brake operation member receives an appropriate reaction force. In the second mode, the pressure of the working fluid in the first fluid chamber of the simulator is equal to the pressure of the working fluid supplied from the master cylinder, as in the first mode. In the second mode, however, the pressure of the working fluid in the second fluid chamber is also equal to the pressure of the working fluid supplied from the master cylinder. Consequently, the simulator does not work in the second mode. Specifically, even when the operation amount of the brake operation member becomes large, there is established a state in which the volume of the first fluid chamber does not increase. Thus, the operation amount of the brake operation member does not become unnecessarily large in the second mode, resulting in generation of an appropriate braking force in accordance with the operation amount.

Ordinary known simulators do not include the second fluid chamber. In ordinary known master-cut type hydraulic brake devices, the electromagnetic open/close valve is provided between the first fluid chamber and the master fluid passage. By switching the state of the open/close valve between the valve open state and the valve closed state, there are selectively established a state in which the simulator works and a state in which the simulator does not work.

In the hydraulic brake device according to the present disclosure, in contrast, the state in which the simulator works and the state in which the simulator does not work can be selectively established without employing the open/close valve described above, so that the hydraulic brake device has a reduced size and is simplified in structure by eliminating the open/close valve. Further, the elimination of the electromagnetic open/close valve in turn eliminates provision of the drive circuit for driving the open/close valve and the harness for electrically connecting the drive circuit and the open/close valve, ensuring a higher advantage of the reduction in the size of the device and the simplification of the structure of the device.

(2) The hydraulic brake device according to the form (1), wherein the master shut-off valve is a normally-opened electromagnetic open/close valve, and the return passage opening valve is a normally-closed electromagnetic open/close valve.

(3) The hydraulic brake device according to the form (1) or (2), wherein, when at least any one of the master shut-off valve, the return passage opening valve, and the electromagnetic control valve is in failure, the master shut-off valve is in the valve open state and the return passage opening valve is in the valve closed state, and no electric current is supplied to the electromagnetic control valve.

In the above two forms, there is added limitation as to specific measures for establishing, in the failure condition, the second mode and the state in which the simulator does not work. According to these forms, the second mode and the state in which the simulator does not work are easily, in other words, automatically, established in the failure condition.

(4) The hydraulic brake device according to any one of the forms (1) through (3), wherein the stroke simulator is disposed beside the master cylinder or is integral with the master cylinder.

The simulator is a functional component for enabling an operation feeling of the brake operation member connected to the master cylinder to be appropriate. In view of this, the simulator is preferably disposed near the master cylinder.

(5) The hydraulic brake device according to any one of the forms (1) through (3), further comprising an actuator unit which is disposed away from the master cylinder and in which the pump device, the electromagnetic control valve, and the return passage opening valve are incorporated, the stroke simulator being also incorporated in the actuator unit.

Most master-cut type hydraulic brake devices employ the actuator unit. Meanwhile, the second fluid chamber of the simulator needs to be connected to the return fluid passage on one of opposite sides of the return passage opening valve that is nearer to the wheel brake. In other words, a connection passage connecting the second fluid chamber and the return fluid passage is needed. According to this form, the simulator is incorporated in the actuator unit, thereby reducing the length of the connection passage.

(6) The hydraulic brake device according to any one of the forms (1) through (5), which includes two systems respectively corresponding to mutually different wheels, wherein the master cylinder includes two pressurizing pistons disposed in series with each other for pressurizing the working fluid in respective two pressurizing chambers corresponding to the two systems, wherein two master fluid passages, each as the master fluid passage, are respectively connected to the two pressurizing chambers, wherein the master cylinder further includes two return springs respectively disposed in the two pressurizing chambers for respectively returning the two pressurizing pistons to respective positions at which the two pressurizing pistons are located when the brake operation member is not operated, and wherein the first fluid chamber of the stroke simulator is connected to one of the two master fluid passages which is connected to one of the two pressurizing chambers in which is disposed one of the two return springs having a smaller set load.

In a two-system master cylinder in which two pressurizing pistons are disposed in series with each other, namely, in the so-called tandem master cylinder, two return springs are provided for respective two pressurizing pistons, and a set load is often made different between the two return springs for permitting the master cylinder to be operated with high stability. In such a master cylinder, the pressurizing piston, for which one of the two return springs having a smaller set load is provided, is moved forward prior to the pressurizing piston for which the other of the two return springs having a larger set load is provided. According to this form, therefore, in the state in which the simulator works, the working fluid flows from the master cylinder into the first fluid chamber of the simulator at an earlier stage of the brake operation of the brake operation member, so that a better operation feeling of the brake operation member, namely, a better brake feeling, can be obtained.

(10) A vehicle brake system, including:

the hydraulic brake device defined in any one of the forms (1) through (6) and provided for one of a front wheel and a rear wheel; and an electric brake device provided for the other of the front wheel and the rear wheel and configured to generate a braking force for the other of the front wheel and the rear wheel in dependence on a force generated by an electric motor.

This form is one form of a vehicle brake system in which the hydraulic brake device described above and an electric brake device are combined. The hydraulic brake device has the advantage of high reliability, and the electric brake device has the advantage of good response. Thus, the vehicle brake system according to this form offers the advantage of high reliability and the advantage of good response, in addition to the advantage offered by the hydraulic brake device in the forms described above.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Figure 1:
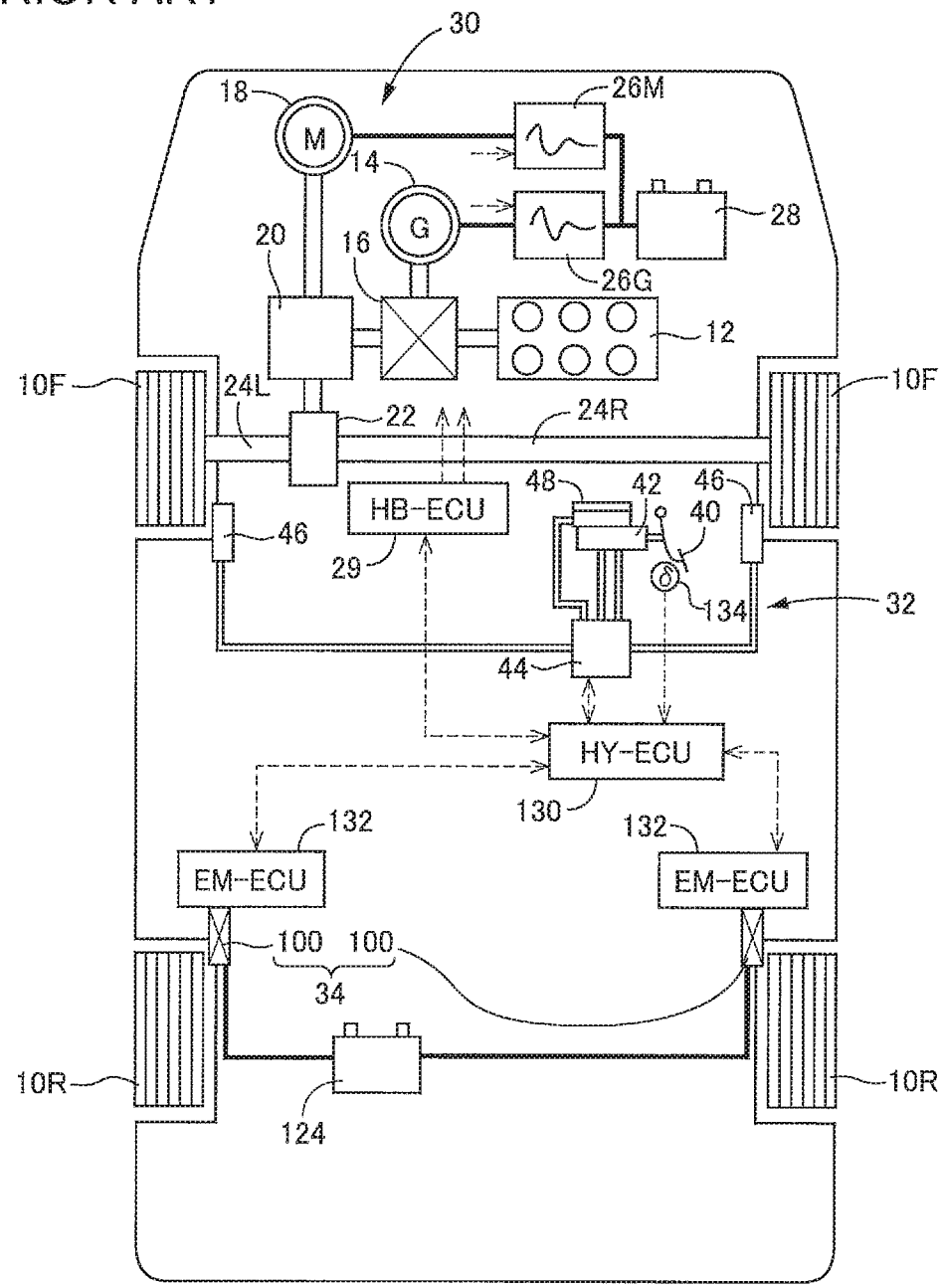
FIG. 1 is a view conceptually showing an overall structure of a vehicle brake system that has been conventionally proposed.

Referring to the drawings, there will be explained below in detail a vehicle brake system according to an embodiment of the claimable invention, a hydraulic brake device included in the system, and a modification of the hydraulic brake device. It is to be understood that the claimable invention is not limited to the details of the following embodiments but may be embodied based on the forms described in Forms of the Invention and may be changed and modified based on the knowledge of those skilled in the art.

There will be initially explained a conventionally proposed vehicle brake system and hydraulic brake device as a basis of a vehicle brake system and a hydraulic brake device according to the embodiment. Thereafter, the hydraulic brake device according to the embodiment and a hydraulic brake device according to a modified embodiment will be explained.

[1] Conventionally Proposed Vehicle Brake System (A) Outline of Vehicle Drive System and Vehicle Brake System As schematically shown in FIG. 1, a vehicle on which a conventionally proposed vehicle brake system (hereinafter simply referred to as "conventional system" where appropriate) is installed is a hybrid vehicle having two front wheels 10F and two rear wheels 10R, and the two front wheels 10F are drive wheels. The vehicle drive system is first explained. The vehicle drive system installed on the present vehicle includes an engine 12 as a drive source, a generator 14 that functions mainly as an electric generator, a power-distribution mechanism 16 to which the engine 12 and the generator 14 are coupled, and an electric motor 18 as another drive source.

The power-distribution mechanism 16 has a function of distributing rotation of the engine 12 to rotation of the generator 14 and rotation of an output shaft. The electric motor 18 is coupled to the output shaft via a reduction mechanism 20 functioning as a speed reducer. Rotation of the output shaft is transmitted to the front left and right wheels 10F via a differential mechanism 22 and respective drive shafts 24L, 24R, so that the front left and right wheels 10F are drivingly rotated. The generator 14 is coupled to a battery 28 via an inverter 26G. Electric energy obtained by electric power generation of the generator 14 is stored in the battery 28. The electric motor 18 is coupled to the battery 28 via an inverter 26M. The electric motor 18 and the generator 14 are controlled by controlling the inverter 26M and the inverter 26G, respectively. Management of a charged amount of the battery 28 and control of the inverter 26M and the inverter 26G are executed by a hybrid electronic control unit (hereinafter abbreviated as "HB-ECU" as shown in FIG. 1) 29 that includes a computer and drive circuits (drivers) for components of the vehicle drive system.

As schematically shown in FIG. 1, the vehicle brake system installed on the vehicle includes (a) a regenerative brake device 30 configured to give a braking force to each of the two front wheels 10F, (b) a hydraulic brake device 32 configured to give a braking force to each of the two front wheels 10F, independently of the braking force given by the regenerative brake device 30, and (c) an electric brake device 34 configured to give a braking force to each of the two rear wheels 10R.

(B) Structure of Regenerative Brake Device

In terms of hardware, the regenerative brake device 30 constitutes a part of the vehicle drive system. When the vehicle decelerates, the electric motor 18 is rotated by rotation of the front wheels 10F without receiving a power supply from the battery 28. The electric motor 18 generates electric power utilizing an electromotive force generated by its rotation, and the generated electric power is stored, via the inverter 26M, in the battery 28 as a quantity of electricity (which may be also referred to as an electric quantity or an electric charge). That is, the electric motor 18 functions as an electric generator, so that the battery 28 is charged. The rotation of the front wheels 10F is decelerated, namely, the vehicle is decelerated, by a degree corresponding to energy that corresponds to the charged electric quantity. In the present vehicle, the regenerative brake device 30 is thus configured. The braking force given by the regenerative brake device 30 to the front wheels 10F (hereinafter referred to as "regenerative braking force" where appropriate) depends on the generated electric power, and the generated regenerative braking force is controlled by the control of the inverter 26M executed by the HB-ECU 29. A detailed explanation of the regenerative brake device 30 is dispensed with because any regenerative brake device having a known ordinary structure may be employed as the regenerative brake device 30.

(C) Structure of Hydraulic Brake Device i) Overall Structure

The hydraulic brake device 32 includes (a) a master cylinder 42 to which is connected a brake pedal 40, as a brake operation member, to be operated by a driver, (b) an actuator unit 44 configured to allow the working fluid from the master cylinder 42 to pass therethrough so as to supply the working fluid or to adjust the pressure of the working fluid pressurized by its pump (that will be explained) so as to supply the working fluid, and (c) two wheel brakes 46 respectively provided for the front left and right wheels 10F and configured to decelerate rotation of the respective front left and right wheels 10F by the pressure of the working fluid supplied from the actuator unit 44. The hydraulic brake device 32 is a two-system device or a tandem device corresponding to the front left and right wheels 10F.

ii) Structure of Master Cylinder

Figure 2:
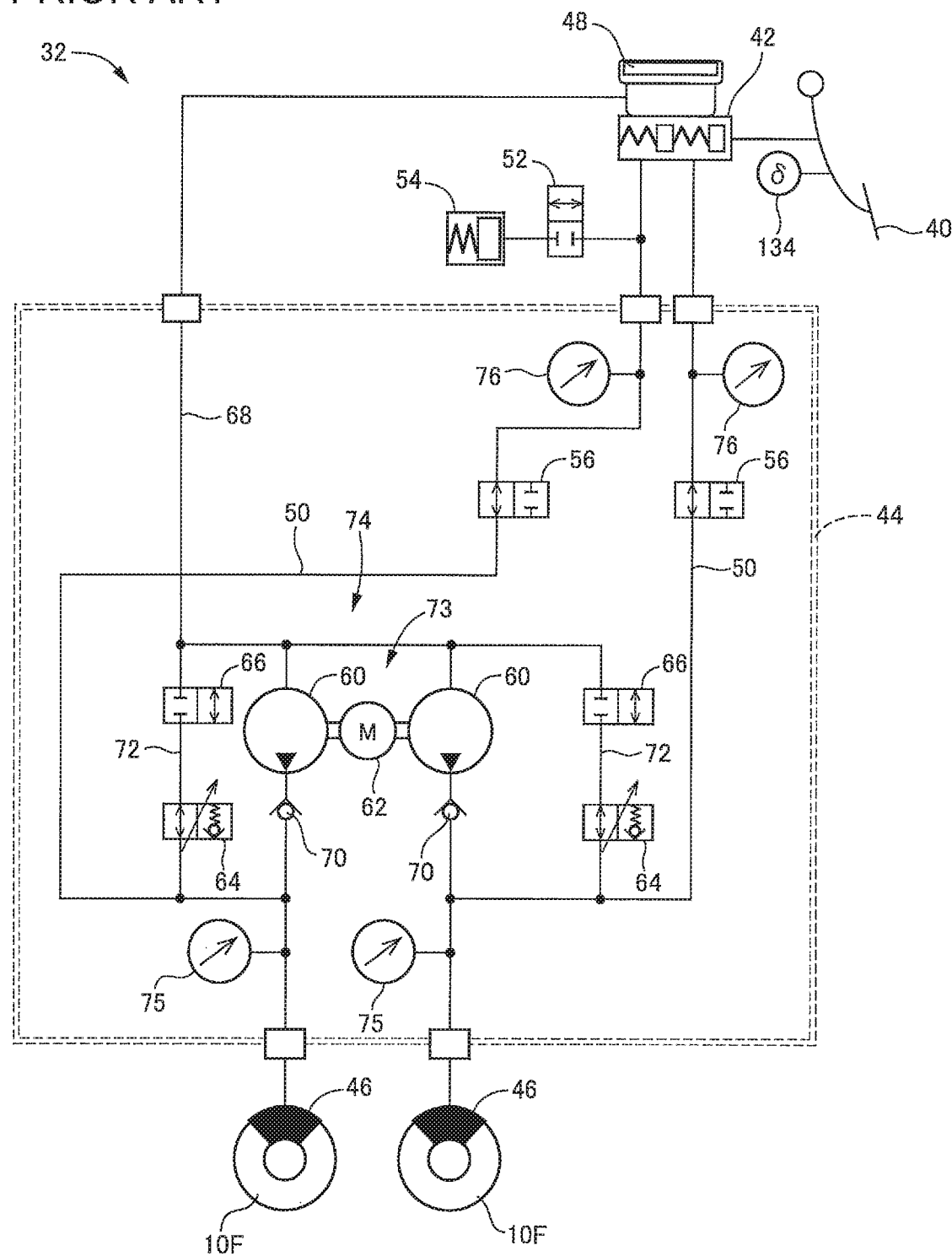
FIG. 2 is a hydraulic circuit diagram of a hydraulic brake device of the vehicle brake system shown in FIG. 1.
Figure 3:
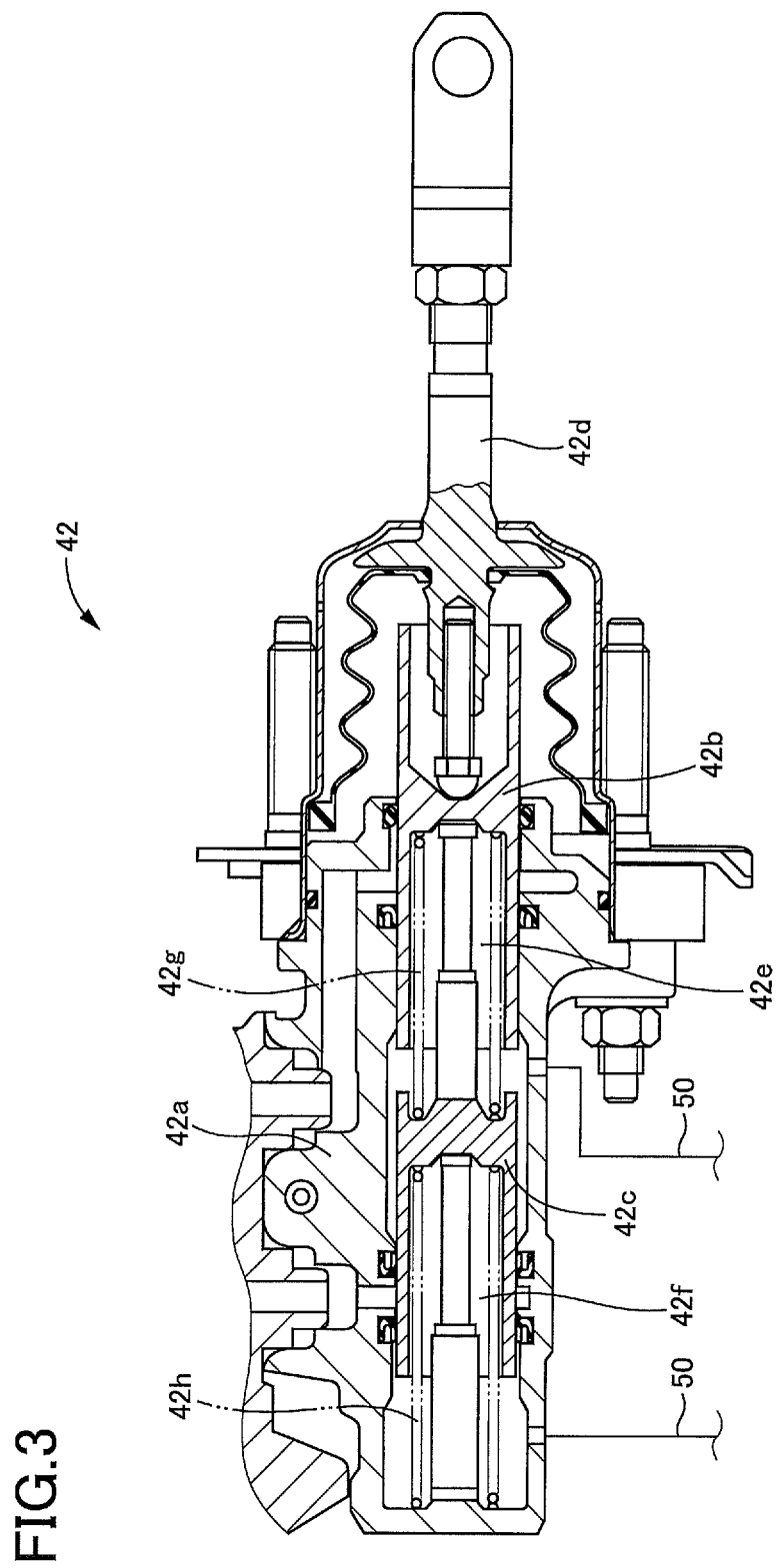
FIG. 3 is a cross-sectional view of a master cylinder of the hydraulic brake device shown in FIG. 2.

As shown in the schematic view of FIG. 2 and the cross-sectional view of FIG. 3 illustrating a detailed structure of the master cylinder 42, the master cylinder 42 is a tandem master cylinder including two pressurizing pistons 42b, 42c which are disposed in series with each other in a housing 42a so as to correspond to the two systems. One of the two pressurizing pistons, i.e., the pressurizing piston 42b, is held in engagement with a link rod 42d connected to the brake pedal 40. Two pressurizing chambers 42e, 42f corresponding to the respective two pressurizing pistons 42b, 42c are formed respectively on front sides of the pressurizing pistons 42b, 42c. To the master cylinder 42, there is attached a reservoir 48, as a low-pressure source, for storing the working fluid under the atmospheric pressure. That is, the reservoir 48 is disposed beside the master cylinder 42. The working fluid from the reservoir 48 is pressurized in each of the two pressurizing chambers 42e, 42f by movements of the respective two pressurizing pistons 42b, 42c caused by an operation of the brake pedal 40 (hereinafter referred to as "brake operation" where appropriate). The master cylinder 42 is configured to supply, to the actuator unit 44, the working fluid whose pressure corresponds to a force applied to the brake pedal 40 (hereinafter referred to as "brake operation force" where appropriate), for the respective two systems that correspond to the respective two front wheels 10F. Specifically, the actuator unit 44 has fluid passages through which the working fluid supplied from the master cylinder 42 flows toward the respective wheel brakes 46. That is, the hydraulic brake device 32 has two fluid passages through which the working fluid is supplied from the master cylinder 42 to the respective wheel brakes 46, i.e., two master fluid passages 50 (FIG. 2). In the hydraulic brake device 32, the working fluid can be supplied from the master cylinder 42 to the wheel brakes 46 via the respective master fluid passages 50. Each of the wheel brakes 46 has a wheel cylinder (that will be explained), and the working fluid is supplied to the wheel cylinder.

The master cylinder 42 includes two return springs 42g, 42h corresponding to the respective two pressurizing pistons 42b, 42c. In accordance with the brake operation, the two pressurizing pistons 42b, 42c move forward against biasing forces of the respective return springs 42g, 42h. The pressurizing pistons 42b, 42c stop at respective positions shown in FIG. 3, namely, at respective rear end positions. The mechanism by which the pressurizing pistons 42b, 42c stop at the rear end positions is not illustrated in FIG. 3. The return springs 42g, 42h are configured to apply respective set loads (pre-loads) to the respective pressurizing pistons 42b, 42c in a state in which the pressurizing pistons 42b, 42c are located at the respective rear end positions. For ensuring a good brake operation feeling, for instance, the set load applied by the return spring 42h to the pressurizing piston 42c is made smaller than the set load applied by the return spring 42g to the pressurizing piston 42b. Consequently, when the brake operation is initiated, the pressurizing piston 42c moves forward at timing earlier than the pressurizing piston 42b.

iii) Stroke Simulator

Figure 4:
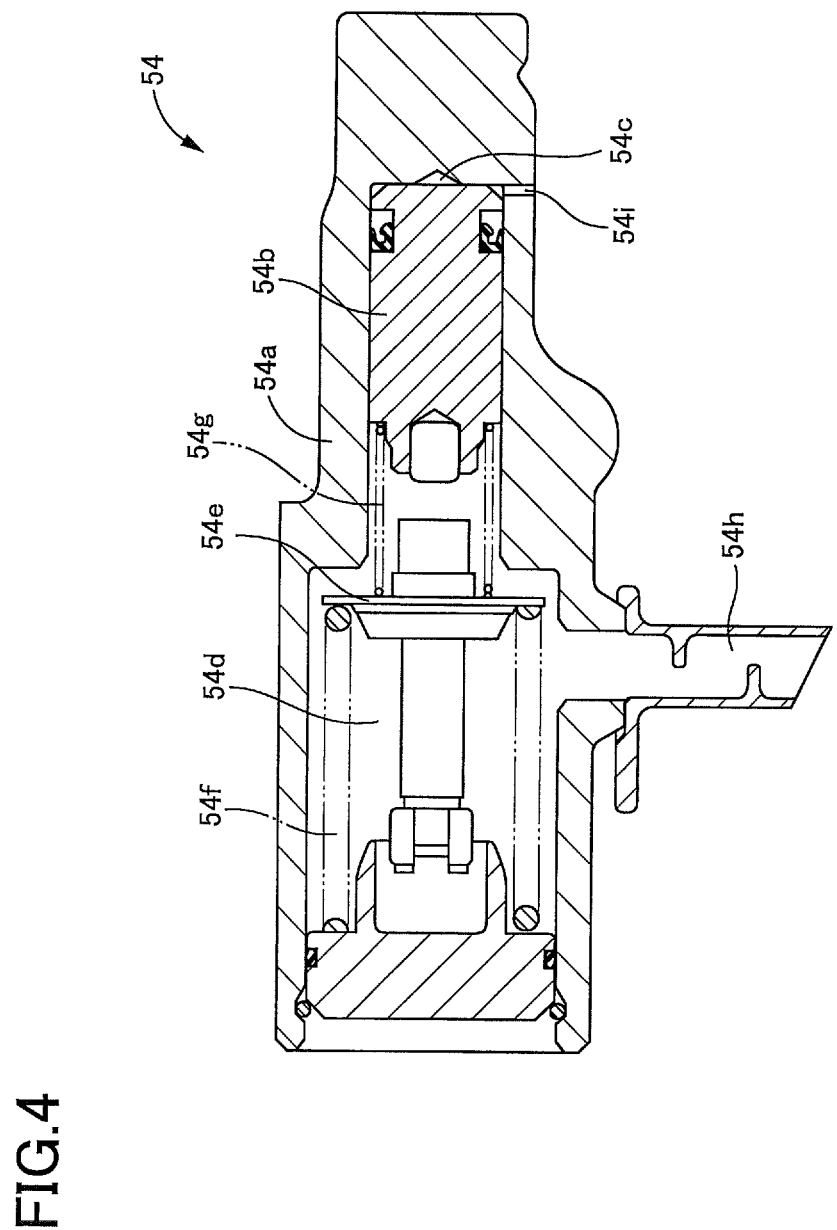
FIG. 4 is a cross-sectional view of a stroke simulator of the hydraulic brake device shown in FIG. 2.

As shown in FIG. 2, a stroke simulator 54 (hereinafter abbreviated as "simulator 54" where appropriate) is connected to one of the master fluid passages 50 via a simulator opening valve 52. The simulator opening valve 52 is a normally-closed electromagnetic open/close valve. (The "normally-closed" open/close valve is a valve which is in a valve closed state when not energized.) The simulator 54 has a structure shown in FIG. 4. Specifically, the simulator 54 includes a housing 54a and a piston 54b disposed in the housing 54a. The piston 54b divides an inside of the housing 54a into two chambers, i.e., a fluid chamber 54c and an atmospheric chamber 54d. In FIG. 4, the piston 54b is located at its rear end position, and the fluid chamber 54c located on the right side of the piston 54b is almost deflated or compressed. In the atmospheric chamber 54d located on the left side of the piston 54b, two return springs 54f, 54g are disposed in series with each other with a retainer 54e sandwiched therebetween.

The atmospheric chamber 54d is released to the atmosphere through an introduction hole 54h. The fluid chamber 54c is connected, via a port 54i, to the one of the master fluid passages 50 between the master shut-off valve 56 and the master cylinder 42. When the simulator opening valve 52 is in a valve open state, the fluid chamber 54c communicates with the master fluid passage 50. When the working fluid flows from the master fluid passage 50 into the fluid chamber 54c, the piston 54b moves forward in the left direction to a position in accordance with the pressure of the working fluid, against biasing forces of the return springs 54f, 54g. The right-side return spring 54g has a spring constant smaller than that of the left-side return spring 54f, whereby a gradient of an increase in the forward movement of the piston 54b with respect to an increase in the pressure of the working fluid is made large at an early stage of the forward movement of the piston 54b. The return springs 54f, 54g respectively give slight set loads to the piston 54b in a state in which the piston 54b is located at its rear end position shown in FIG. 4.

In view of the structure of the simulator 54 described above, the piston 54b functions as a partition member that defines the fluid chamber 54c, and the return springs 54f, 54g constitute a pressurizing mechanism for pressurizing the working fluid in the fluid chamber 54c in accordance with an increase in the volume of the fluid chamber 54c caused by the movement of the piston 54b. The simulator 54 is provided for the one of the two master fluid passages 50 that is connected to one of the two pressurizing chambers 42e, 42f of the master cylinder 42, namely, the pressurizing chamber 42f in which is disposed the return spring 42h having a smaller set load. That is, the fluid chamber 54c of the simulator 54 is connected to that master fluid passage 50, whereby the simulator 54 works at an earlier stage of the brake operation.

iv) Structure of Actuator Unit

The actuator unit 44 includes: the two master shut-off valves 56, each as a normally-opened electromagnetic open/close valve, configured to open and close the respective two master fluid passages 50; a pair of pumps 60 corresponding to the two systems; a motor 62 for driving the pumps 60; a pair of pressure holding valves 64, each as electromagnetic linear valve (electromagnetic control valve), corresponding to the two systems; and a pair of opening valves 66, each as a normally-closed electromagnetic open/close valve, disposed in series with the respective pressure holding valves 64. Here, the "normally-opened" open/close valve is a valve which is in a valve open state when not energized. In the hydraulic brake device 32, only one reservoir is provided, and the two pumps 60 are configured to pump up the working fluid from the reservoir 48. To this end, there is formed a reservoir fluid passage 68 that connects the two pumps 60 and the reservoir 48, and a part of the reservoir fluid passage 68 is located in the actuator unit 44. Each of the pumps 60 is connected to the corresponding master fluid passage 50 on its ejection side and supplies, to the corresponding wheel brake 46, the pressurized working fluid via a part of the master fluid passage 50. On the ejection side of each of the pumps 60, a check valve 70 is provided for preventing a backflow of the working fluid to the pump 60.

A pair of return fluid passages 72 are formed in the actuator unit 44 so as to correspond to the two systems. Each of the return passages 72 is formed in parallel with the corresponding pump 60 so as to connect the corresponding master fluid passage 50 and the reservoir fluid passage 68. In each of the return fluid passages 72, the pressure holding valve 64 and the opening valve 66 are provided. Each opening valve 66 is a valve for opening the corresponding return fluid passage 72. Accordingly, the opening valve 66 will be referred to as "return passage opening valve 66" where appropriate. Conversely, the opening valve 66 is a valve that closes the return fluid passage 72 in its non-energized state. Accordingly, the opening valve 66 may be regarded as a shut-off valve. In the actuator unit 44, the two pumps 60 and the motor 62 constitute one pump device 73 functioning as a high-pressure source. Further, a controlled fluid pressure supply device 74 is constituted by the pump device 73, the reservoir fluid passage 68 connected to the reservoir 48 not via the master cylinder 42, the two return fluid passages 72, the two pressure holding valves 64, and the two return passage opening valves 66. The controlled fluid pressure supply device 74 is configured to supply, to the wheel brakes 46, the working fluid from the pump device 73 while controlling the pressure of the working fluid.

In the actuator unit 44, a pair of wheel cylinder pressure sensors 75 and a pair of master pressure sensors 76 are provided so as to correspond to the two systems. Each wheel cylinder pressure sensor 75 is configured to detect the pressure of the working fluid supplied to the corresponding wheel brake 46 (hereinafter referred to as "wheel cylinder pressure" where appropriate). Each master pressure sensor 76 is configured to detect the pressure of the working fluid supplied from the master cylinder 42 (hereinafter referred to as "master pressure" where appropriate).

v) Structure of Wheel Brake

Figure 5A:
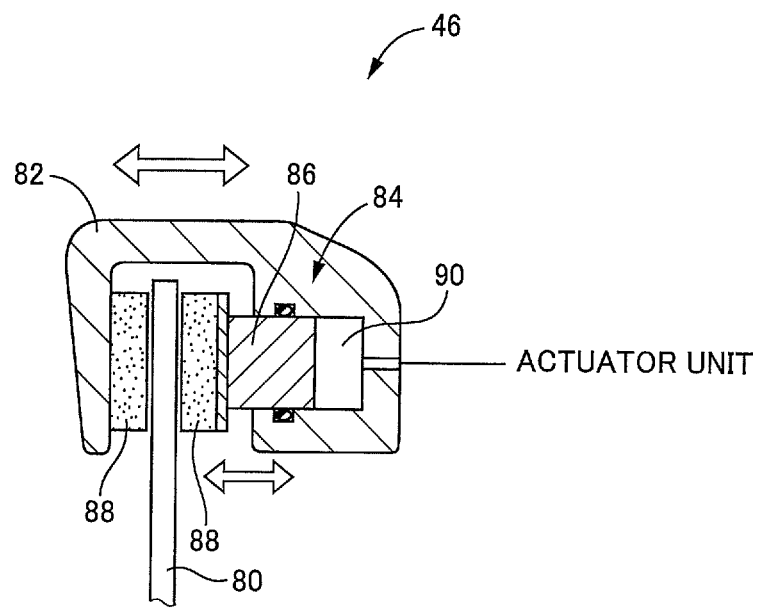
FIG. 5A is a cross-sectional view of a wheel brake of a hydraulic brake device of the vehicle brake system shown in FIG. 1.

Each wheel brake 46 for stopping rotation of the corresponding front wheel 10F is a disc brake device schematically shown in FIG. 5A. Each wheel brake 46 includes a disc rotor 80, as a rotation body, configured to rotate together with the corresponding front wheel 10F and a caliper 82 movably supported by a carrier that rotatably holds the front wheel 10F. The caliper 82 incorporates a wheel cylinder 84 whose housing is defined by a part of the caliper 82. A pair of brake pads 88, each as a friction member, is provided such that one brake pad 88 is attached to and held by a distal end of a piston 86 of the wheel cylinder 84 and the other brake pad 88 is attached to and held by a portion of the caliper 82 located opposite to a portion thereof in which the wheel cylinder 84 is incorporated. Thus, the two brake pads 88 are opposed to each other with the disc rotor 80 interposed therebetween.

The working fluid is supplied from the actuator unit 44 to a fluid chamber 90 of the wheel cylinder 84, and the pressure of the working fluid causes the brake pads 88 to nip the disc rotor 80 therebetween. That is, the wheel cylinder 84 is operated to cause the brake pads 88 to be pushed onto the disc rotor 80. Thus, each wheel brake 46 generates, utilizing a friction force, a braking force to stop rotation of the corresponding front wheel 10F, i.e., a braking force to brake the vehicle (hereinafter referred to as "hydraulic braking force" where appropriate). The hydraulic braking force has a magnitude in accordance with the pressure of the working fluid supplied from the actuator unit 44. The wheel brakes 46 have a known ordinary structure, and a detailed explanation thereof is dispensed with.

(D) Structure of Electric Brake Device

Figure 5B:
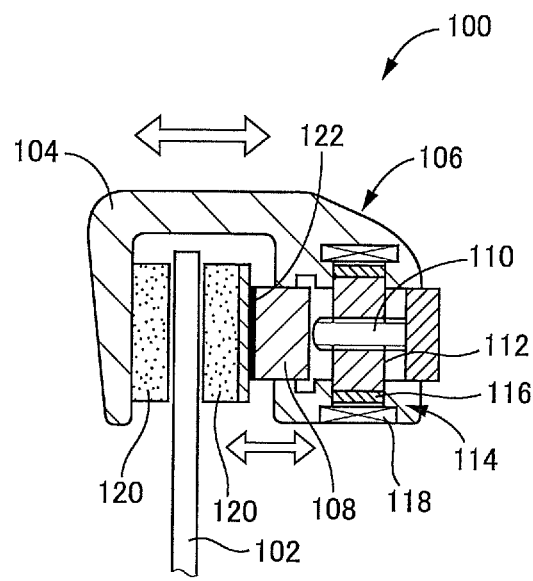
FIG. 5B is a cross-sectional view of a wheel brake of an electric brake device of the vehicle brake system shown in FIG. 1.

As shown in FIG. 1, the electric brake device 34 includes a pair of wheel brakes 100 for stopping rotation of the corresponding rear wheels 10R. As shown in FIG. 5B, each wheel brake 100 is similar in structure to the wheel brakes 46 of the hydraulic brake device 32. Each wheel brake 46 operates by the pressure of the working fluid whereas each wheel brake 100 operates by a force of an electric motor.

Each wheel brake 100 includes a disc rotor 102, as a rotation body, configured to rotate together with the corresponding rear wheel 10R and a caliper 104 movably supported by a carrier that rotatably holds the corresponding rear wheel 10R. The caliper 104 incorporates an electric actuator 106. The electric actuator 106 includes (a) a plunger 108 held by the caliper 104 so as to be advanceable and retractable, (b) a threaded rod 110 which is held by the caliper 104 so as to be unrotatable and so as to be advanceable and retractable and which has an external thread formed on its outer circumference, (c) a nut 112 which has an internal thread that is held in engagement with the external thread of the threaded rod 110 and which is held by the caliper 104 so as to be rotatable and so as not to be advanceable and retractable, and (d) an electric motor 114 configured to rotate the nut 112. The electric motor 114 includes: magnets 116 attached to an outer circumference of the nut 112; and coils 118 held by the caliper 104.

A pair of brake pads 120, each as a friction member, is provided such that one brake pad 120 is attached to and held by a distal end of the plunger 108 of the electric actuator 106 and the other brake pad 120 is attached to and held by a portion of the caliper 104 located opposite to a portion thereof in which the electric actuator 106 is disposed. Thus, the two brake pads 120 are opposed to each other with the disc rotor 102 interposed therebetween. The electric actuator 106 is configured such that the brake pads 120 are pushed onto the disc rotor 102 by rotation of the electric motor 114 as a drive source. In other words, the electric actuator 106 includes a mechanism constituted by the plunger 108, the threaded rod 110, and the nut 112, namely, a motion converting mechanism for moving the friction members by a force of the electric motor 114. That is, each wheel brake 100 of the electric brake device 34 controls a force to be generated by the electric motor 114 and applies the force as a force for stopping or decelerating the rotation of the wheel, via the motion converting mechanism.

Thus, each wheel brake 100 of the electric brake device 34 generates, utilizing a friction force, a braking force to stop rotation of the corresponding rear wheel 10R, namely, a braking force to brake the vehicle (hereinafter referred to as "electric braking force" where appropriate). The electric braking force depends on a pushing force by which the brake pad 120 is pushed by the plunger 108. Each wheel brake 100 has a pushing force sensor 122, as a load cell, provided between the plunger 108 and the brake pad 120 for detecting the pushing force. The wheel brakes 100 have a known ordinary structure, and a detailed explanation thereof is dispensed with. As shown in FIG. 1, electric current is supplied to the electric motor 114 of each wheel brake 100 from an auxiliary battery 124 different from the battery 28.

(E) Control of Brake System and Operation of Hydraulic Brake Device i) Control System Control of the vehicle brake system, namely, control of a braking force F, is executed by a control system shown in FIG. 1. (Hereinafter, respective braking forces are collectively referred to as "braking force F" where appropriate). Specifically, the hydraulic brake device 32 is controlled by an electronic control unit for the hydraulic brake device (hereinafter abbreviated as "HY-ECU" where appropriate) 130. The electric brake device 34 is controlled by two electronic control units for the electric brake device (hereinafter each abbreviated as "EM-ECU" where appropriate) 132 provided for the respective wheel brakes 100. The HY-ECU 130 includes a computer and drivers (drive circuits) for components of the hydraulic brake device 32. Each of the EM-ECUs 132 includes a computer and drivers (drive circuits) for components of the electric brake device 34. As explained above, the regenerative brake device 30 is controlled by the HB-ECU 29.

More specifically, the HB-ECU 29 controls the inverters 26G, 26M that constitute the regenerative brake device 30, the HY-ECU 130 controls the actuator unit 44 that constitutes the hydraulic brake device 32, specifically, controls the pressure holding valves 64, the motor 62 of the pump device 73, etc., and the EM-ECUs 132 control the electric motors 114 of the wheel brakes 100 that constitute the electric brake device 34, thereby controlling the regenerative braking force, the hydraulic braking force, and the electric braking force. Consequently, an overall braking force, which is the braking force F to be given to the vehicle as a whole, is controlled. In the vehicle brake system, the HB-ECU 29, the HY-ECU 130, and the EM-ECUs 132 are connected to one another by a network in the vehicle (CAN) and execute the respective controls while performing communication with one another. As later explained, the HY-ECU 130 functions, in the vehicle brake system, as a main electronic control unit that also controls the HB-ECU 29 and the EM-ECUs 132.

ii) Operation of Hydraulic Brake Device in Normal Condition

In the normal condition, the hydraulic brake device 32 is operated in a first mode by the HY-ECU 130. In the first mode, both of the master shut-off valves 56 for the respective two systems are energized so as to be placed in the valve closed state, so that the working fluid is prohibited from flowing from the master cylinder 42 to the wheel brakes 46 through the master fluid passages 50. In the first mode, the return passage opening valves 66 are energized so as to be placed in the valve open state, so that the working fluid is allowed to flow into the reservoir 48 through the return fluid passages 72. In the first mode, the pumps 60 are driven by the motor 62, so that the pump device 73 pumps up the working fluid stored in the reservoir 48 via the reservoir fluid passage 68 and pressurizes the working fluid. The pressurized working fluid is supplied to the wheel brakes 46. Each of the pressure holding valves 64 has a function of adjusting the pressure of the working fluid to be supplied to the wheel brakes 46, so as to reduce the pressure in accordance with an electric current supplied thereto. There is supplied, to each pressure holding valve 64, an electric current determined based on a target hydraulic braking force (which will be explained), so that each wheel brake 46 generates the hydraulic braking force based on the target hydraulic braking force. The working fluid that passes through the pressure holding valves 64 for pressure reduction is returned to the reservoir 48 via the return fluid passages 72 and the reservoir fluid passage 68.

In the first mode, the simulator opening valve 52 is also energized so as to be placed in the valve open state. Consequently, the working fluid is allowed to flow from the master cylinder 42 into the fluid chamber 54*c* of the simulator 54, so that the simulator 54 works. That is, the brake pedal 40 is allowed to be operated in an appropriate operation amount, and the operation reaction force in accordance with the operation amount is applied to the brake pedal 40. Thus, the driver can feel an appropriate operation feeling with respect to the brake operation. In the hydraulic brake device 32, the simulator 54 is disposed beside or near the master cylinder 42, greatly contributing to achievement of an appropriate operation feeling. The simulator 54 does not necessarily have to be disposed beside the master cylinder 42, but may be integral with the master cylinder 42.

iii) Operation of Hydraulic Brake Device in Failure Condition

In the failure condition, namely, when the hydraulic brake device 32 suffers from an electric failure in which no electric current can be supplied to at least any one of the electromagnetic valves, the hydraulic brake device 32 is operated in a second mode. In the second mode, the master shut-off valves 56 and the return passage opening valves 66 are not energized, so that the master shut-off valves 56 are in the valve open state while the return passage opening valves 66 are in the valve closed state. That is, the master shut-off valves 56 allow the working fluid to flow from the master cylinder 42 to the respective wheel brakes 46, and the return passage opening valves 66 prohibit the working fluid from flowing to the reservoir 48 through the respective return fluid passages 72. Further, no electric current is supplied to the pump device 73 and the pressure holding valves 64, so that the pump device 73 is not driven and the pressure holding valves 64 are in the valve open state. Accordingly, the working fluid is supplied from the master cylinder 42 to the wheel brakes 46, so that the wheel brakes 46 generate the braking force in accordance with the brake operation.

In the second mode, the simulator opening valve 52 is also not energized, so that the simulator opening valve 52 is in the valve closed state. Accordingly, the working fluid is prohibited from flowing from the master cylinder 42 into the fluid chamber 54*c* of the simulator 54, so that the simulator 54 does not work. That is, there is established a state in which the working fluid from the master cylinder 42 is supplied mainly to the wheel brakes 46, whereby the operation amount of the brake pedal 40 is prevented from becoming excessively large. As a result, an appropriate operation feeling of the brake pedal 40 is ensured also in the second mode.

iv) Control of Braking Force

Control of the braking force in the vehicle brake system is briefly explained. In the normal condition, the regenerative brake device 30, the hydraulic brake device 32, and the electric brake device 34 are controlled such that the braking force in accordance with the operation amount of the brake pedal 40 is generated by the brake devices 30, 32, 34. Specifically, the HY-ECU 130 determines a required overall braking force which is a braking force required by the vehicle as a whole based on the operation amount of the brake pedal 40 detected by the operation stroke sensor 134. In the vehicle brake system, the regenerative braking force is preferentially generated, and an insufficient braking force, which is a braking force that cannot be covered by the regenerative braking force, is covered by the hydraulic braking force generated by the hydraulic brake device 32 and the electric braking force generated by the electric brake device 34. According to the rule, the HY-ECU 130 determines the insufficient braking force based on a target regenerative braking force obtained by communication with the HB-ECU 29 and determines a target hydraulic braking force and a target electric braking force based on the insufficient braking force and a set distribution ratio. On the basis of the target regenerative braking force, the target hydraulic braking force, and the target electric braking force, the HB-ECU 29, the HY-ECU 130, and the EM-ECUs 132 respectively control the regenerative brake device 30, the hydraulic brake device 32, and the electric brake device 34, and the brake devices 30, 32, 34 respectively generate the regenerative braking force, the hydraulic braking force, and the electric braking force. In the hydraulic brake device 32, a supply current to the pressure holding valves 64 is controlled based on the target hydraulic braking force.

In the failure condition, the hydraulic brake device 32 is operated in the second mode. Thus, the hydraulic braking force is not controlled by the HY-ECU 130. Instead, in the second mode, the hydraulic braking force having a magnitude in accordance with the brake operation is generated by the operation force applied to the brake pedal 40 by the driver.

[2] Hydraulic Brake Device According to Present Embodiment

Figure 6:
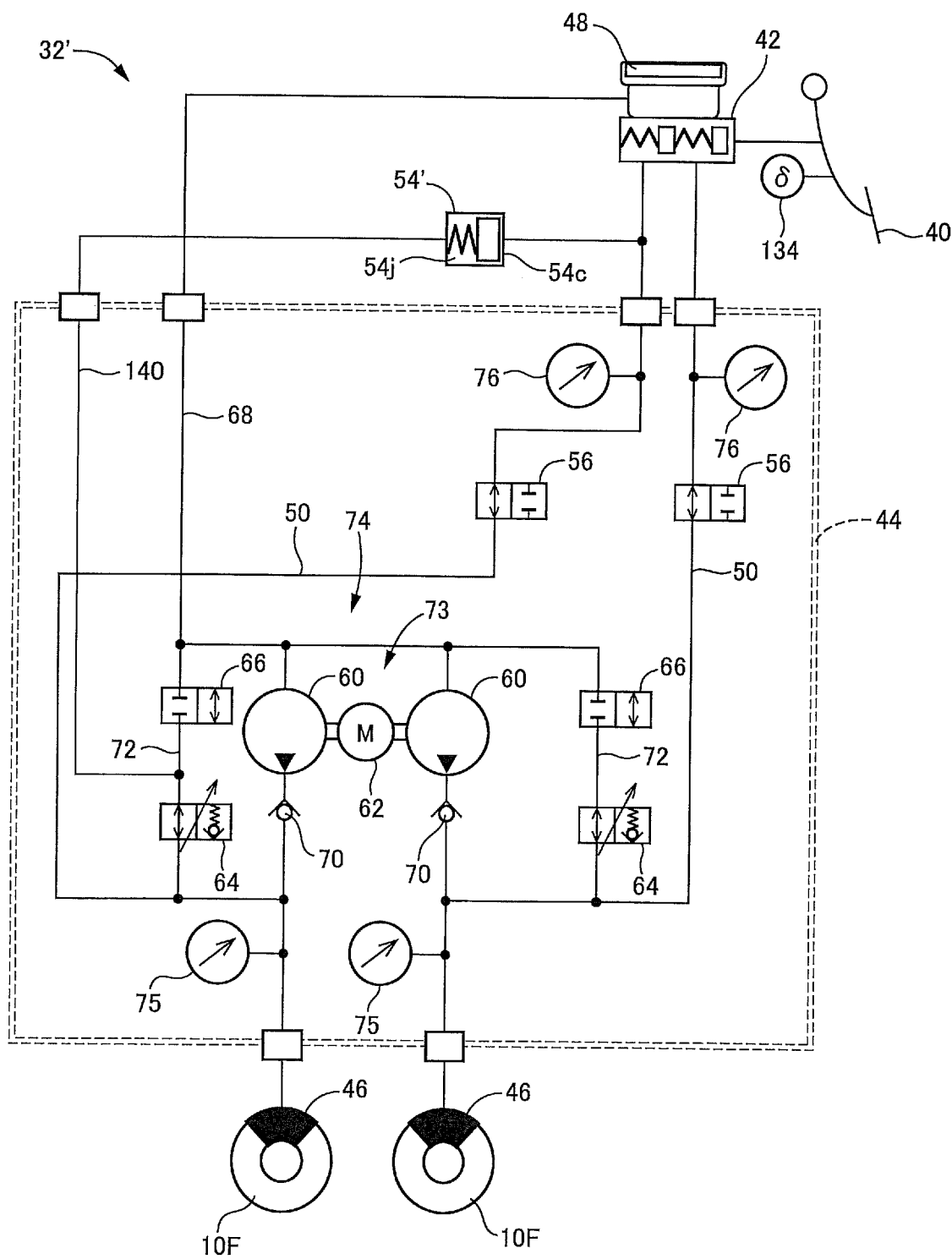
FIG. 6 is a hydraulic circuit diagram of a hydraulic brake device according to an embodiment.
Figure 7:
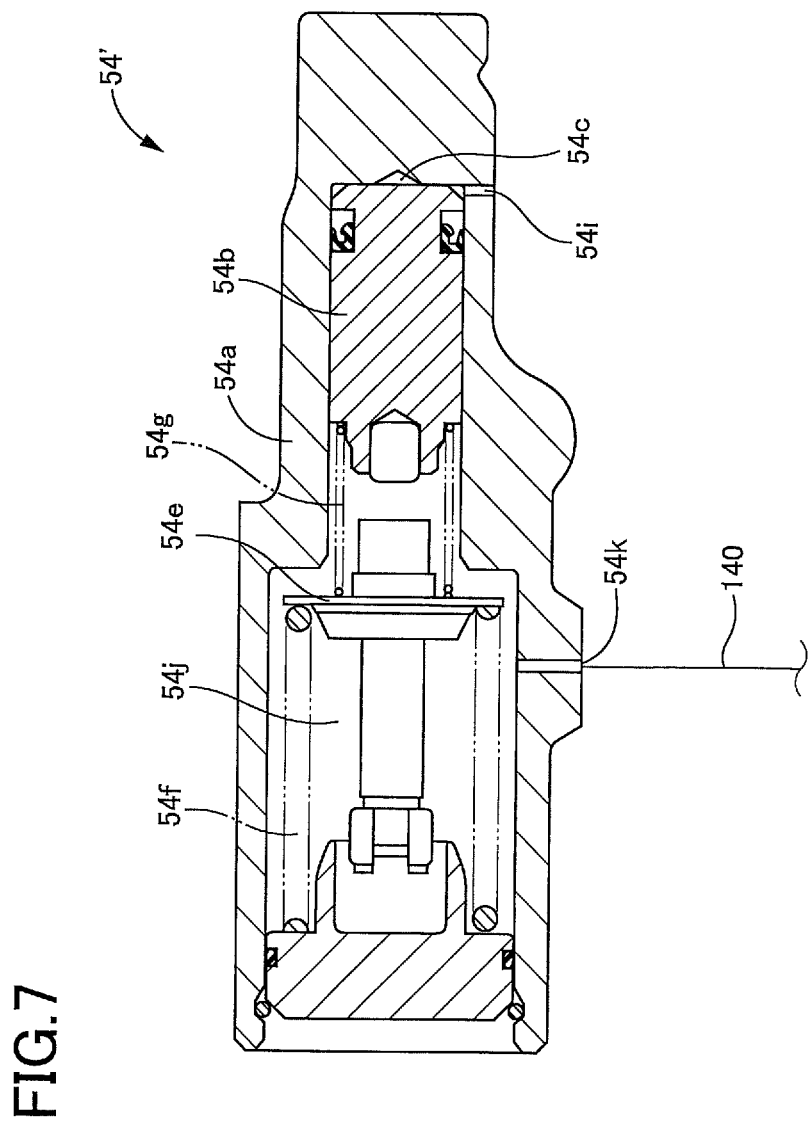
FIG. 7 is a cross-sectional view of a stroke simulator of the hydraulic brake device shown in FIG. 6.

A vehicle brake system according to the present embodiment includes a hydraulic brake device 32' shown in a hydraulic circuit diagram of FIG. 6. As compared with the conventionally proposed hydraulic brake device 32, the hydraulic brake device 32' according to the present embodiment is improved in terms of the structure of the stroke simulator. That is, the hydraulic brake device 32' shown in the hydraulic circuit diagram of FIG. 6 includes, in place of the simulator 54 shown in FIG. 4, a stroke simulator 54' shown in FIG. 7. (Hereinafter, the stroke simulator 54' will be simply referred to as the simulator 54' where appropriate.)

The simulator 54' includes: a first fluid chamber 54c similar to the fluid chamber 54c of the simulator 54; and a second fluid chamber 54j in place of the atmospheric chamber 54d of the simulator 54. Accordingly, a port 54k for the working fluid is formed in the housing 54a, in place of the introduction hole 54h of the simulator 54. Other constituent components of the simulator 54' are the same as the simulator 54.

As shown in FIG. 6, a simulator fluid passage 140 is provided in the hydraulic brake device 32' according to the embodiment. The second fluid chamber 54j of the simulator 54' is connected, via the port 54k and the simulator fluid passage 140, to each of the return fluid passages 72 of the actuator unit 44 on one of opposite sides of the corresponding return passage opening valve 66 that is nearer to the wheel brake 46, specifically, between the corresponding return passage opening valve 66 and the corresponding pressure holding valve 64. It is noted that the simulator opening valve 52 used in the conventional hydraulic brake device 32 is not provided in the present hydraulic brake device 32'. Instead, the first fluid chamber 54c is connected directly to the master fluid passage 50 via the port 54i.

In the present hydraulic brake device 32' having the thus constructed simulator 54', the return passage opening valves 66 are placed in the valve open state in the first mode, so that the second fluid chamber 54j of the simulator 54' communicates with the reservoir 48, in other words, the second fluid chamber 54j is released to the atmospheric pressure. Thus, in the first mode, the simulator 54' works similarly to the simulator 54 of the hydraulic brake device 32.

In the second mode, on the other hand, the master shut-off valves 56 are placed in the valve open state, the pressure holding valves 64 are placed in the valve open state, and the return passage opening valves 66 are placed in the valve closed state, so that the pressure of the working fluid in the first fluid chamber 54c and the pressure of the working fluid in the second fluid chamber 54j become equal to each other. Thus, the simulator 54' does not work. In other words, even if the brake pedal 40 is operated, the piston 54b of the simulator 54' does not move, and the volume of the first fluid chamber 54c does not change.

According to the present hydraulic brake device 32' constructed as described above, it is possible to selectively establish the state in which the simulator 54' works and the state in which the simulator 54' does not work depending upon the operation mode, without providing the open/close valve (the simulator opening valve 52 in the hydraulic brake device 32) between the master fluid passage 50 and the simulator 54'. Thus, the elimination of the open/close valve contributes to downsizing and simplification of the hydraulic brake device 32'. Further, the elimination of the electromagnetic open/close valve such as the simulator opening valve 52 in turn eliminates provision of a drive circuit for driving the open/close valve, a harness for electrically connecting the drive circuit and the open/close valve and so on, ensuring a higher advantage of downsizing and simplification of the device.

[3] Modified Embodiment

Figure 8:
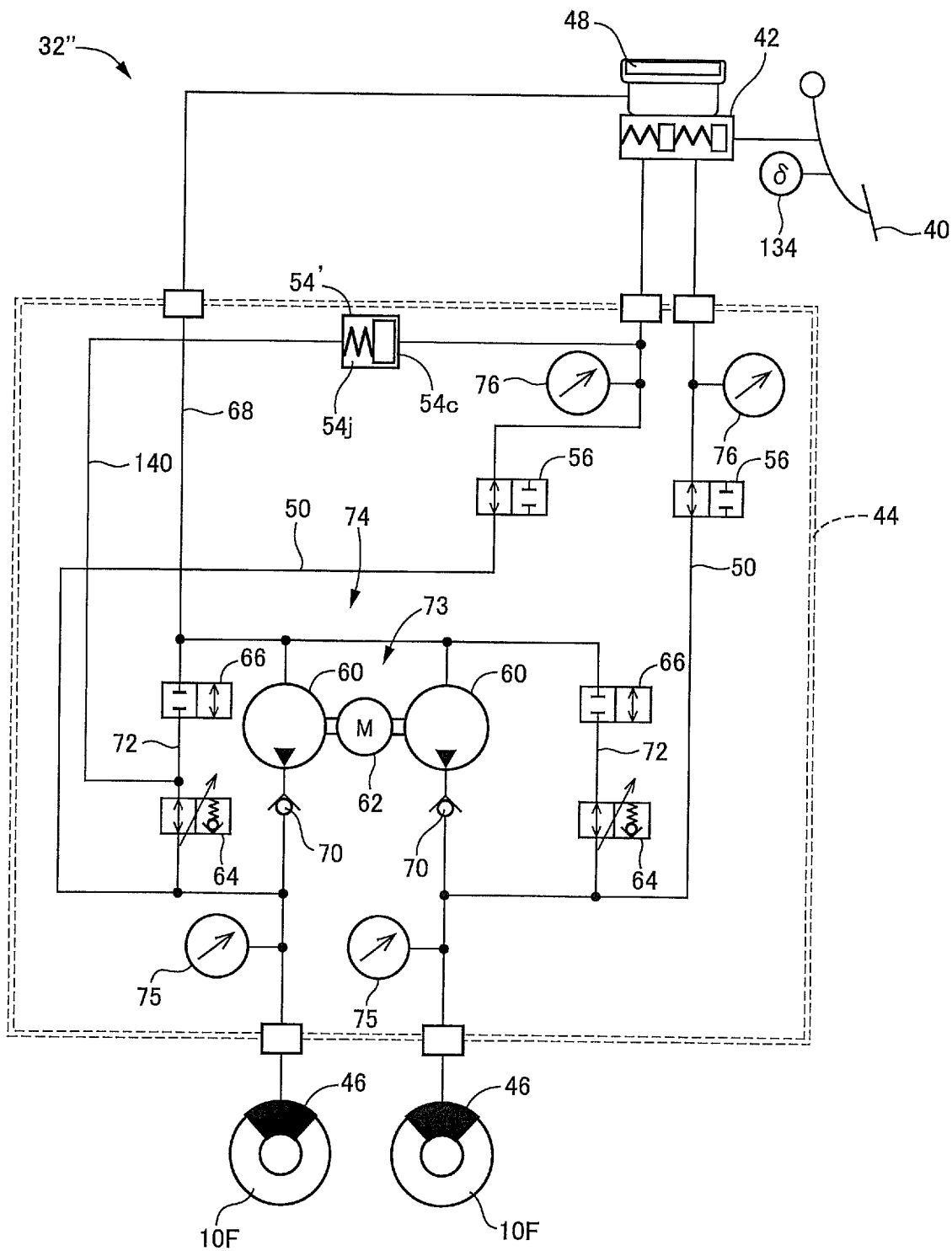
FIG. 8 is a hydraulic circuit diagram of a hydraulic brake device according to a modified embodiment.

In the hydraulic brake device 32' illustrated above, the simulator 54' is disposed beside or near the master cylinder 42 or the simulator 54' is integral with the master cylinder 42. The simulator 54' may be incorporated in the actuator unit 44 like a hydraulic brake device 32" shown in a hydraulic circuit diagram of FIG. 8. In the hydraulic brake device 32" of this modified embodiment in which the simulator 54' is incorporated in the actuator unit 44, the simulator fluid passage 140 is formed also in the actuator unit 44, thereby eliminating provision of a long fluid passage required for connection. This further contributes to downsizing and simplification of the hydraulic brake device.

While the hydraulic brake device 32' illustrated above is configured to give the braking force to the two front wheels, a hydraulic brake device according to the present disclosure may be configured to give the braking force to the four wheels, i.e., the front right and left wheels and the rear right and left wheels. In all of the hydraulic brake devices 32, 32', 32", the return fluid passages 72 are connected to the reservoir fluid passage 68 and are connected to the reservoir 48 via the reservoir fluid passage 68. Instead, the return fluid passages may be connected directly to the reservoir 48, and the working fluid may be returned to the reservoir 48 directly from the return fluid passages.

What is claimed is:

1. A hydraulic brake device configured to generate a braking force for a wheel in dependence on a pressure of a working fluid, comprising:
    a brake operation member to be operated by a driver;
    a wheel brake provided for the wheel and configured to generate the braking force in accordance with the pressure of the working fluid supplied thereto;
    a reservoir storing the working fluid and functioning as a low-pressure source;
    a master cylinder configured to pressurize the working fluid stored in the reservoir in dependence on a force applied to the brake operation member by the driver;
    a master fluid passage connecting the master cylinder and the wheel brake for supplying, to the wheel brake, the working fluid pressurized by the master cylinder;
    a master shut-off valve provided in the master fluid passage and configured to allow a flow of the working fluid from the master cylinder to the wheel brake when it is in a valve open state and configured to prohibit the flow of the working fluid from the master cylinder to the wheel brake when it is in a valve closed state;
    a reservoir fluid passage connected to the reservoir not via the master cylinder;
    a pump device configured to function as a high-pressure source by being activated when the master shut-off valve is in the valve closed state and configured to pump up the working fluid stored in the reservoir via the reservoir fluid passage and configured to pressurize the working fluid, so as to supply the pressurized working fluid to the wheel brake,
    a return fluid passage connecting the reservoir or the reservoir fluid passage to the wheel brake;
    a return passage opening valve provided in the return fluid passage and configured to be in a closed state when the master shut-off valve is in the open state so as to prohibit a flow of the working fluid to the reservoir through the return fluid passage and configured to be in a valve open state when the master shut-off valve is in the valve closed state so as to allow the flow of the working fluid to the reservoir through the return fluid passage;
    an electromagnetic control valve provided in the return fluid passage so as to be disposed in series with the return passage opening valve, the electromagnetic control valve being configured such that, when the master shut-off valve is in the valve closed state, the electromagnetic control valve controls a flow of the working fluid from the wheel brake to the reservoir in accordance with an electric current supplied thereto so as to control the braking force to be generated by the wheel brake and such that, when the master shut-off valve is in the valve open state, no electric current is supplied to the electromagnetic control valve and the electromagnetic control valve allows a flow of the working fluid passing therethrough without controlling the flow; and a stroke simulator including a partition member, a first fluid chamber and a second fluid chamber which are defined by the partition member and which respectively store the working fluid, and a pressurizing mechanism configured to pressurize the working fluid in the first fluid chamber in accordance with an increase in a volume of the first fluid chamber caused by a movement or a deformation of the partition member, the first fluid chamber being connected to the master fluid passage between the master shut-off valve and the master cylinder, the second fluid chamber being connected to the return fluid passage on the side of the return passage opening valve that is nearer to the wheel brake.

2. The hydraulic brake device according to claim 1, wherein the master shut-off valve is a normally-opened electromagnetic open/close valve, and the return passage opening valve is a normally-closed electromagnetic open/close valve.

3. The hydraulic brake device according to claim 1, wherein, when at least any one of the master shut-off valve, the return passage opening valve, and the electromagnetic control valve is in failure, the master shut-off valve is in the valve open state and the return passage opening valve is in the valve closed state, and no electric current is supplied to the electromagnetic control valve.

4. The hydraulic brake device according to claim 1, wherein the stroke simulator is disposed beside the master cylinder or is integral with the master cylinder.

5. The hydraulic brake device according to claim 1, further comprising an actuator unit which is disposed away from the master cylinder and in which the pump device, the electromagnetic control valve, and the return passage opening valve are incorporated, the stroke simulator being also incorporated in the actuator unit.

6. The hydraulic brake device according to claim 1, which includes two systems respectively corresponding to mutually different wheels, wherein the master cylinder includes two pressurizing pistons disposed in series with each other for pressurizing the working fluid in respective two pressurizing chambers corresponding to the two systems, wherein two master fluid passages, each as the master fluid passage, are respectively connected to the two pressurizing chambers, wherein the master cylinder further includes two return springs respectively disposed in the two pressurizing chambers for respectively returning the two pressurizing pistons to respective positions at which the two pressurizing pistons are located when the brake operation member is not operated, and wherein the first fluid chamber of the stroke simulator is connected to one of the two master fluid passages which is connected to one of the two pressurizing chambers in which is disposed one of the two return springs having a smaller set load.

* * * * *